July 28, 1964 — A. R. J. LUKE — 3,142,375
RETRACTABLE FINGER ASSEMBLY
Filed April 11, 1961 — 2 Sheets-Sheet 1

INVENTOR.
ALBERT R. J. LUKE
BY
Wolfe, Hubbard, Voit & Osann
ATTORNEYS.

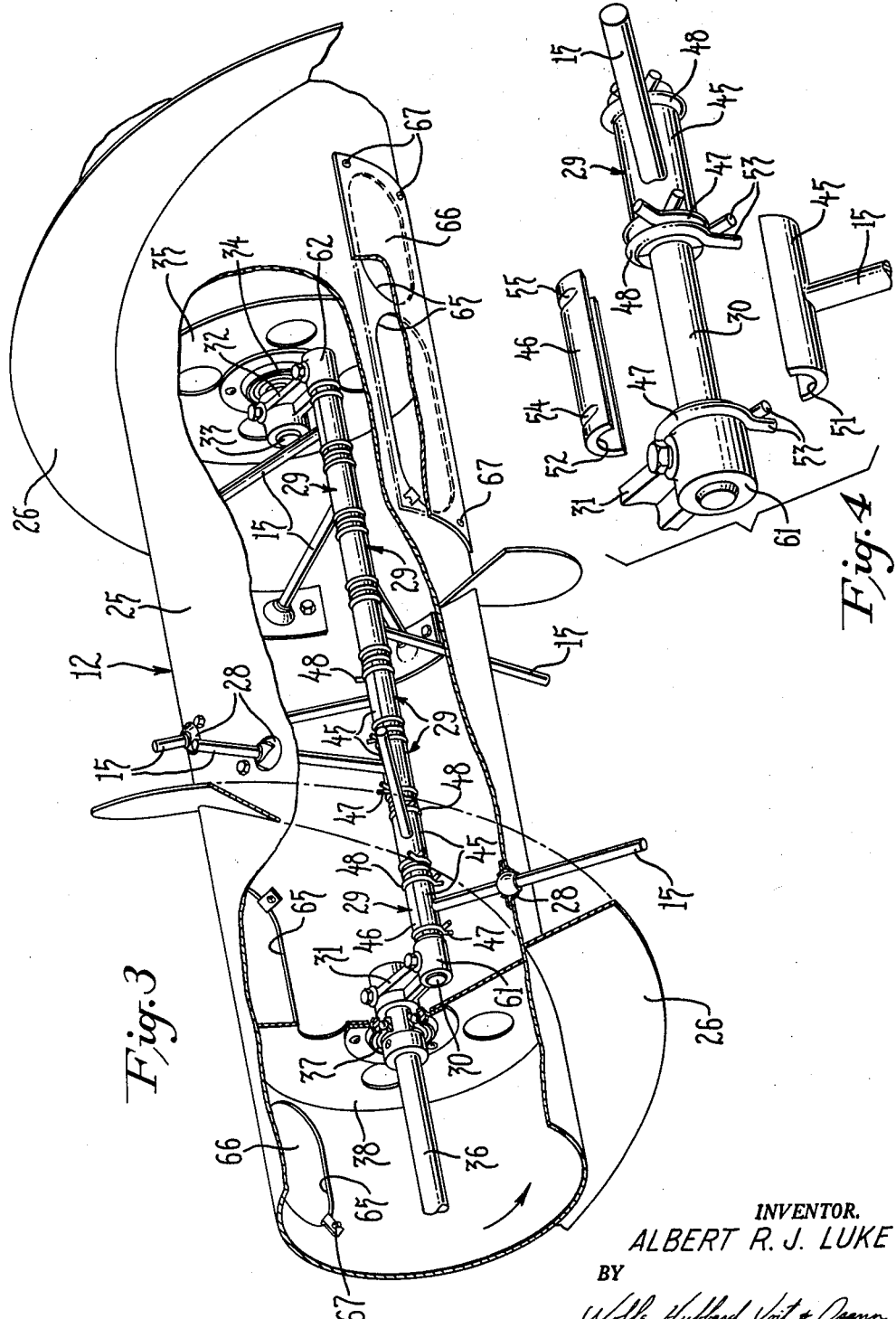

United States Patent Office 3,142,375
Patented July 28, 1964

3,142,375
RETRACTABLE FINGER ASSEMBLY
Albert R. J. Luke, Toronto, Ontario, Canada, assignor to Massey-Ferguson Limited, Toronto, Ontario, Canada, a corporation of Canada
Filed Apr. 11, 1961, Ser. No. 102,242
4 Claims. (Cl. 198—211)

The present invention relates generally to combine crop feeding conveyors and concerns, more particularly, an improved retracting finger construction for such conveyors.

Agricultural combines conventionally employ drum-like conveyors extending the width of their harvesting tables to gather the harvested crop and propel it toward the elevator which carries the crop into the combine. To assist the transfer of crop material from the table conveyor to the elevator, retractable feeder fingers embodied in the table conveyor have been extensively used. The U.S. patent issued February 8, 1955, to Carroll, No. 2,701,634, discloses and claims a crop feeder construction utilizing such retractable fingers.

In a conveyor construction of this kind, the retractable fingers are carried on bearings which rotate on an eccentrically disposed crank shaft. Thus, both the fingers themselves which engage the crop material as well as the finger supporting bearings are subject to wear and must be periodically replaced. Replacement of the retractable fingers and their bearings has heretofore called for virtually a complete disassembly of the entire table conveyor, and since such replacement is most often required in the harvesting season, the resulting "down time" during this critical period is particularly expensive and wasteful.

Accordingly, it is the primary aim of the invention to provide an improved retractable finger construction which permits replacement of worn fingers and their supporting bearings, either singly or as many as necessary, without disassembling the entire conveyor.

It is also an object of the invention to provide a finger construction of the above character which can be removed and installed quickly and easily, using only ordinary tools.

Another important object is to provide a finger construction of the above type that is inexpensive to manufacture; in fact, less expensive than prior art constructions utilizing "permanent" finger bearings requiring lubrication systems.

Other objects and advantages of the invention will become apparent upon reading the following description and upon reference to the drawings, in which:

FIG. 3 is a fragmentary perspective, partially in section, of the conveyor shown in FIG. 2; and FIG. 4 is an exploded fragmentary perspective, somewhat enlarged, of the finger assemblies which appear in FIG. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
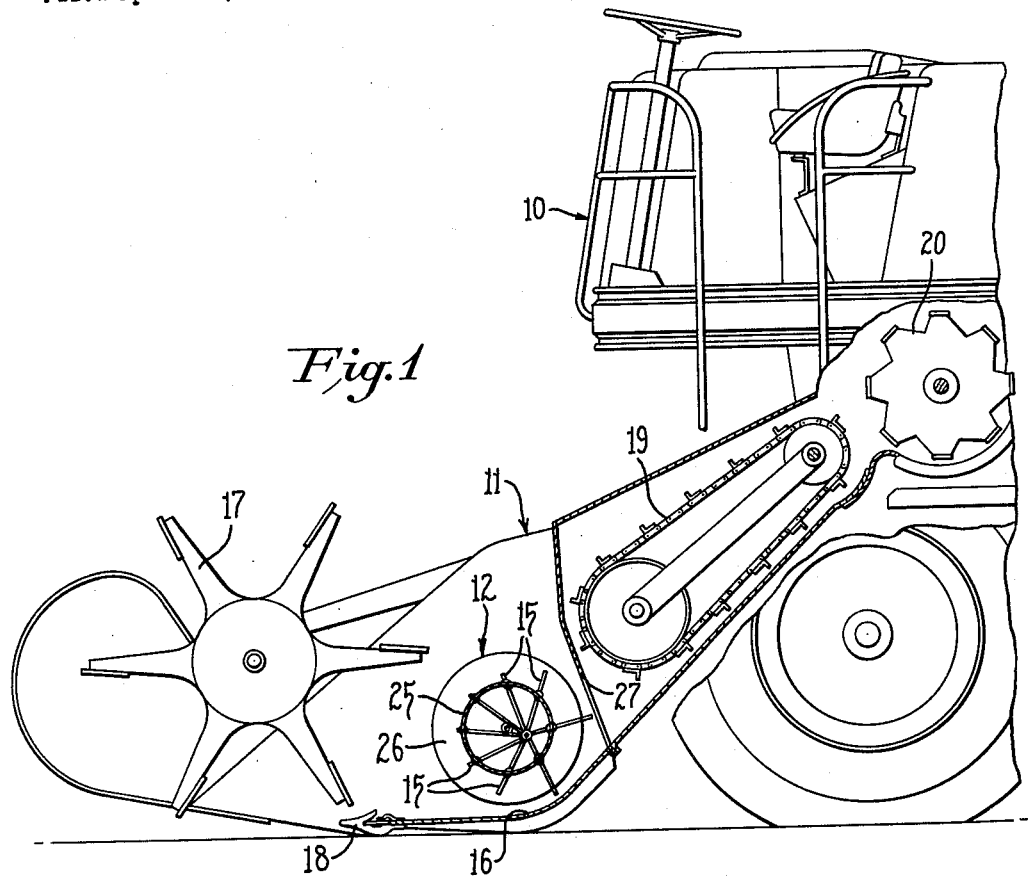
FIGURE 1 is a fragmentary side elevation, partially in section, of the front portion of a combine having retractable finger assemblies constructed in accordance with the invention.

Turning now to FIG. 1, there is shown the forward portion of a combine 10 which includes a header assembly 11 having a crop feeding conveyor 12 carrying retractable fingers 15 which are formed in accordance with the invention. The conveyor 12 is journaled in the header assembly above a table 16 that receives harvested crop material from a reel 17 and a cutter bar assembly 18. The crop material on the table 16 is fed by the conveyor 12 to an elevator 19 which carries the harvested crop to a threshing cylinder 20.

The conveyor 12 includes an elongated drum 25 which carries oppositely wound, auger-like conveyor flights 26 at each end which feed the harvested material toward the center of the table 16 upon rotation of the conveyor. The retracting fingers 15 are disposed at the center portion of the conveyor 12 and are operable to project into the gathered crop and propel it rearwardly through an opening 27 to the elevator 19.

The fingers 15 are rod-like members slidably fitted through apertures 28 in the drum 25 and are rotatably secured by cylindrical bearings 29 to a stationary crank shaft 30 (see FIG. 4). The crank shaft 30 is eccentrically disposed in the drum 25 on a pair of crank arms 31 and 32. The crank arm 32 is secured to a stub shaft 33 that is anchored by a bearing 34 in a wall 35 mounted solidly within the drum 25. The crank arm 31 is secured to an elongated shaft 36 that passes through a bearing 37 in a second drum wall 38. The shaft 36 extends to one end of the conveyor 12 where it is anchored against rotation to the frame of the header assembly 11. The crank shaft 30 thus remains fixed with relation to the header assembly 11 and the drum 25 rotates freely about an axis passing through the centers of the bearings 34, 37.

Figure 2:
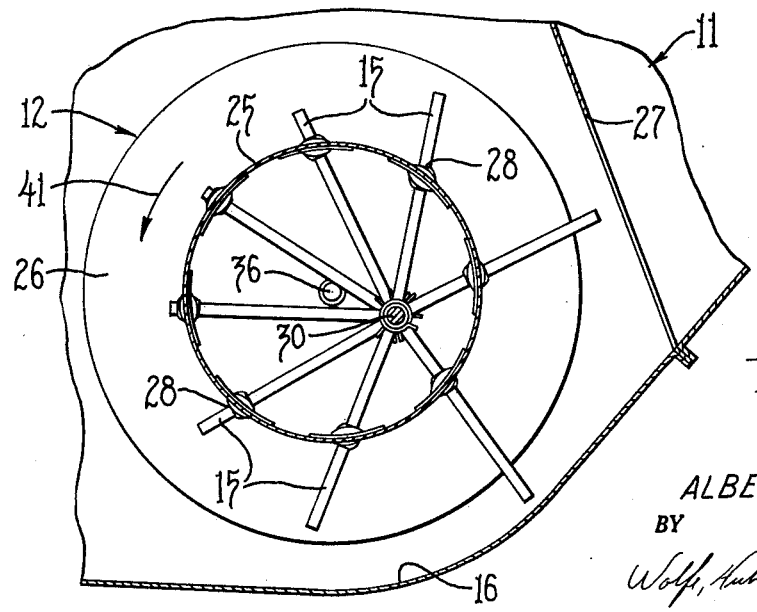
FIG. 2 is an enlarged fragmentary section of the combine crop feeding conveyor shown in FIG. 1.

The plurality of fingers 15 are staggered uniformly about the periphery of the drum 25, as best seen in FIG. 2. Upon rotation of the conveyor 12 in the direction of the arrow 41, each finger projects forwardly and down into the crop material on the table 16, sweeping the material back and to the right in FIG. 2, and then retracting within the body of the drum 25 as the conveyor completes a full revolution. The arrangement of the parts and mode of operation so far described is, of course, conventional and reference may be had to the U.S. patent identified above for a more complete discussion.

In accordance with the present invention, the fingers 15 are rigidly secured to one semicylindrical bearing segment 45 which, with a second semicylindrical bearing segment 46 and a pair of resiliently compressible clamps 47 and 48, make up the bearings 29. Each finger 15 and its supporting bearings 29 is identical.

The segments 45, 46 are formed with interior bearing surfaces 51 and 52 respectively (see FIG. 4) which rotatably fit about the crank shaft 30 when the segments are in abutment. The clamps 47, 48 consist of a circular length of spring wire having slightly overlapped, outwardly extending end portions or tips 53. The circular clamps 47, 48 are formed with a relaxed diameter that is somewhat less than the circumference of the bearing 29, and therefore the clamps must be resiliently distended when fitted about the bearing. In this way, the compressive force exerted by the clamps on the bearing segments 45, 46 resiliently holds these segments together. Preferably, the segment 46 is formed with arcuate grooves 54 and 55 which receive the clamps 47, 48, respectively, and prevent their axial displacement. The grooves 54, 55 are spaced inwardly from the respective ends of the segments 45, 46 a distance that is greater than the width of the clamps 47, 48. Thus, there is sufficient room on the ends of the adjacent bearings 29 to receive the clamps 47, 48 when they are slipped axially from the bearing segments 45, 46 of one of the fingers 15. For a similar reason, the crank arms 31, 32 include cylindrical collar portions 61 and 62 respectively, which abut the endmost finger bearings 29.

The steps of removing and installing one of the fingers 15 and its bearing 29 will now be readily apparent. With reference to the endmost assembly shown exploded in FIG. 4, the operator, in order to disassemble the bearing assembly 29, applied an ordinary pliers to the tips 53 of the clamp 47 so as to open the clamp and release its compressive force on the bearing segments 45, 46, whereupon the clamp is easily slid axially onto the collar 61. Similarly, the bearing clamp 58 is opened and slid axially onto the adjoining bearing 29. It will be appreciated that the clamp 48 is easily received on the end of the adjacent bearing 29 since the adjacent clamp 47 is held spaced from the end of that bearing by a groove 54.

When the two clamps 47, 48 have been removed, the bearing segments 45, 46 are simply separated from the crank shaft 30 and the desired replacement is made. If only the finger 15 is worn, the bearing segment 46 can be reused or, if required, both segments 45, 46 and the finger 15 can be replaced. With the new bearing segments positioned in abutment on either side of the crank shaft 30, a pliers or similar tool is again used to open the clamps 47, 48 and slide them axially until they seat in the respective grooves 54, 55, whereupon assembly and installation of the new finger 15 and its bearing 29 is completed.

Preferably, the drum 25 is provided with a plurality of access openings 65 which are normally closed by cover plates 66 held in place by a plurality of screws 67. Thus, in order to replace any one of the fingers 15, the cover plate 66 from the appropriate opening 65 is removed, thereby allowing the operator to reach into the drum 25 with a common pair of pliers to accomplish his task. It will be obvious that complete disassembly of the conveyor 12 is not necessary when changing any one, or all, of the fingers 15 and their supporting bearings 29.

Although the bearing segments 45, 46 are advantageously formed out of bearing material so as to minimize wear, the ease with which the segments may be replaced makes it more advantageous to rely on replacement of worn bearing segments than to incorporate a lubrication system for supplying lubricant between the bearings 29 and the crank shaft 30. As a result, the initial cost of the conveyor 12 is reduced. In the long run, considering the ease with which replacement of the bearings 29 can be effected, the long term cost of operating the conveyor 12 is also substantially lessened.

I claim as my invention:

1. In a crop feeding conveyor including a rotatable drum enclosing a stationary eccentrically disposed crank shaft, a retractable finger construction comprising, in combination, an elongated finger slidably fitted through an aperture in said drum, said finger being secured to a first generally semicylindrical bearing segment fitted against said shaft, a second generally semicylindrical bearing segment fitted against said shaft opposite said first bearing segment so as to define therewith a cylindrical bearing surrounding said shaft and rotatably mounting said finger on said shaft, and a pair of resiliently compressible clamps snugly surrounding said bearing segments on either side of said finger so as to releasably secure said finger to said shaft.

2. In a crop feeding conveyor including a rotatable drum enclosing a stationary eccentrically disposed crank shaft, a retractable finger construction comprising, in combination, an elongated finger slidably fitted through an aperture in said drum, said finger being secured to a first generally semicylindrical bearing segment fitted against said shaft, a second generally semicylindrical bearing segment fitted against said shaft opposite said first bearing segment so as to define therewith a cylindrical bearing surrounding said shaft and rotatably mounting said finger on said shaft, a pair of resiliently compressible clamps snugly surrounding said bearing supports on either side of said finger so as to releasably secure said finger to said shaft, one of said segments having a pair of arcuate grooves receiving respective ones of said clamps to prevent their axial displacement, said grooves being spaced inwardly from the ends of said segments a distance greater than the width of said clamps whereby similar clamps from adjoining finger constructions can be temporarily placed on the end portions of said segments.

3. A retractable finger construction for a crop feeding drum conveyor comprising, in combination, an elongated finger, a first semicylindrical bearing segment rigidly secured at one end of said finger and disposed at substantially right angles thereto, a second semicylindrical bearing segment abutting said first segment so as to define therewith a substantially cylindrical bearing having a central aperture for receiving a shaft, and a pair of resiliently compressible clamps snugly surrounding said bearing segments on either side of said finger.

4. A retractable finger construction for a crop feeding drum conveyor comprising, in combination, an elongated finger, a first semicylindrical bearing segment rigidly secured at one end of said finger and disposed at substantially right angles thereto, and a second semicylindrical bearing segment abutting said first segment so as to define therewith a substantially cylindrical bearing having a central aperture for receiving a shaft, one of said segments having a pair of arcuate grooves for receiving and preventing the displacement of releasable clamps, said grooves being spaced inwardly from either respective end of said segments a distance greater than the width of said grooves.

References Cited in the file of this patent

UNITED STATES PATENTS

| | | |
|---|---|---|
| 379,221 | Callender | Feb. 5, 1889 |
| 2,180,271 | Arras | Nov. 14, 1939 |
| 2,701,634 | Carroll | Feb. 8, 1955 |
| 2,914,367 | Underwood | Nov. 24, 1959 |